United States Patent [19]

Guetersloh

[11] Patent Number: 4,693,048
[45] Date of Patent: Sep. 15, 1987

[54] MEDIA SUPPORT MODULE FOR PAINT SPRAY BOOTHS AND THE LIKE

[75] Inventor: Timothy L. Guetersloh, Madison, Wis.

[73] Assignee: Research Products Corporation, Madison, Wis.

[21] Appl. No.: 906,932

[22] Filed: Sep. 15, 1986

[51] Int. Cl.⁴ .................... E04C 2/42; B01D 39/04
[52] U.S. Cl. ........................... 52/664; 55/491; 55/DIG. 46; 98/115.2
[58] Field of Search ............ 52/27, 261, 656, 660, 52/663, 664; 160/371, 379; 98/115.2; 118/300, 308, 326; 55/491, 492, DIG. 46

[56] References Cited

U.S. PATENT DOCUMENTS

| | | | |
|---|---|---|---|
| 2,771,963 | 11/1956 | Eichorn | 55/491 X |
| 3,218,784 | 11/1965 | Greiner | 55/491 |
| 3,280,984 | 10/1966 | Sexton et al. | 55/491 X |
| 3,287,003 | 11/1966 | Goettl | 55/491 X |
| 4,003,178 | 1/1977 | Douthwaite | 52/664 |
| 4,493,718 | 1/1985 | Schweizer | 55/491 |

FOREIGN PATENT DOCUMENTS

| | | | |
|---|---|---|---|
| 479972 | 1/1952 | Canada | 55/491 |
| 1020591 | 2/1966 | United Kingdom | 98/115.2 |

*Primary Examiner*—J. Karl Bell
*Attorney, Agent, or Firm*—Andrus, Sceales, Starke & Sawall

[57] ABSTRACT

In accordance with the various aspects of the invention, a spray booth media support module (1) includes a rectangular frame (5) which is of generally channel section. The frame forms opposing spaced end members (7) and connecting side members (8). One frame end has an inwardly bent lip (11) having spaced notches (13) therein. The opposed frame side members have slots (14). A generally rectangular grid (6) is adapted to be removably mounted to the frame. The grid includes spaced elements (15, 16) arrayed generally parallel to the frame end and side members. A plurality of wide prongs (17) extend outwardly from the grid for impaling an overspray-catching pad (4) thereon. At least several prongs are aligned in a vertical tier arrangement. The grid is attached to the frame by placing the grid adjacent the front frame face and angularly lifting it up so the topmost grid element (15a) is within the frame and is aligned with the lip notches, the grid being centered by visually observing the position of the tiered prongs. The grid is then lowered to thus latch into the notches. The grid is also positioned so that a pair of ends of a horizontal grid element (15b) are disposed adjacent the frame side member slots and the element ends pushed therethrough. The grid is then slid downwardly into final position so that the pair of ends are trapped behind the frame front face.

11 Claims, 9 Drawing Figures

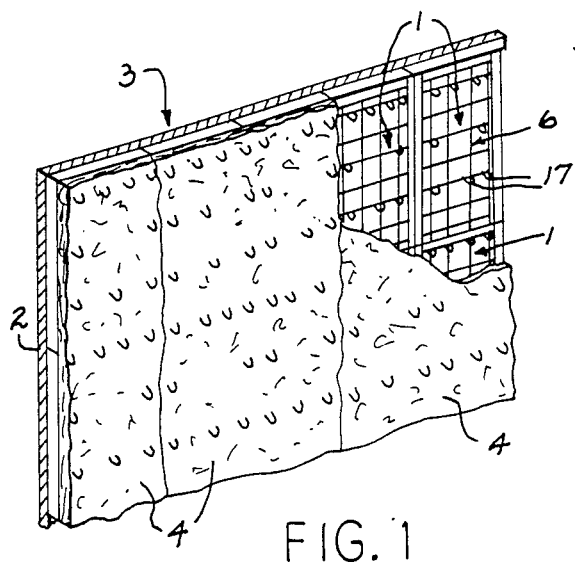
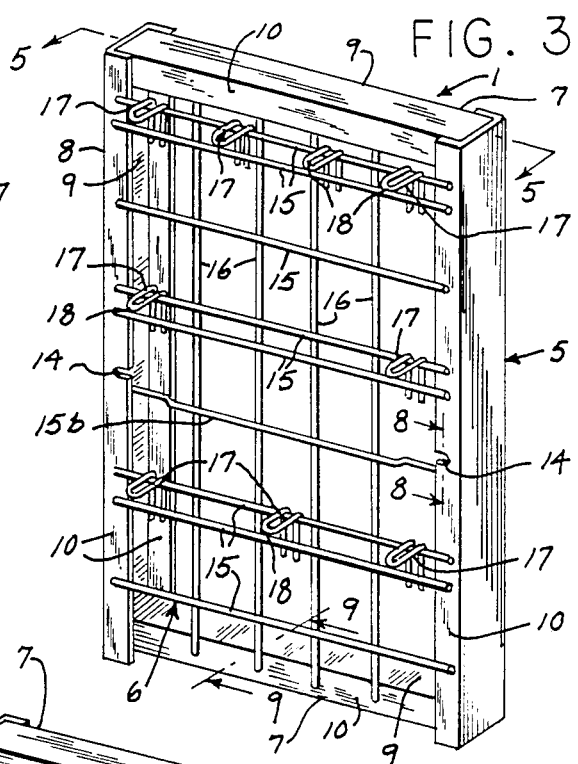
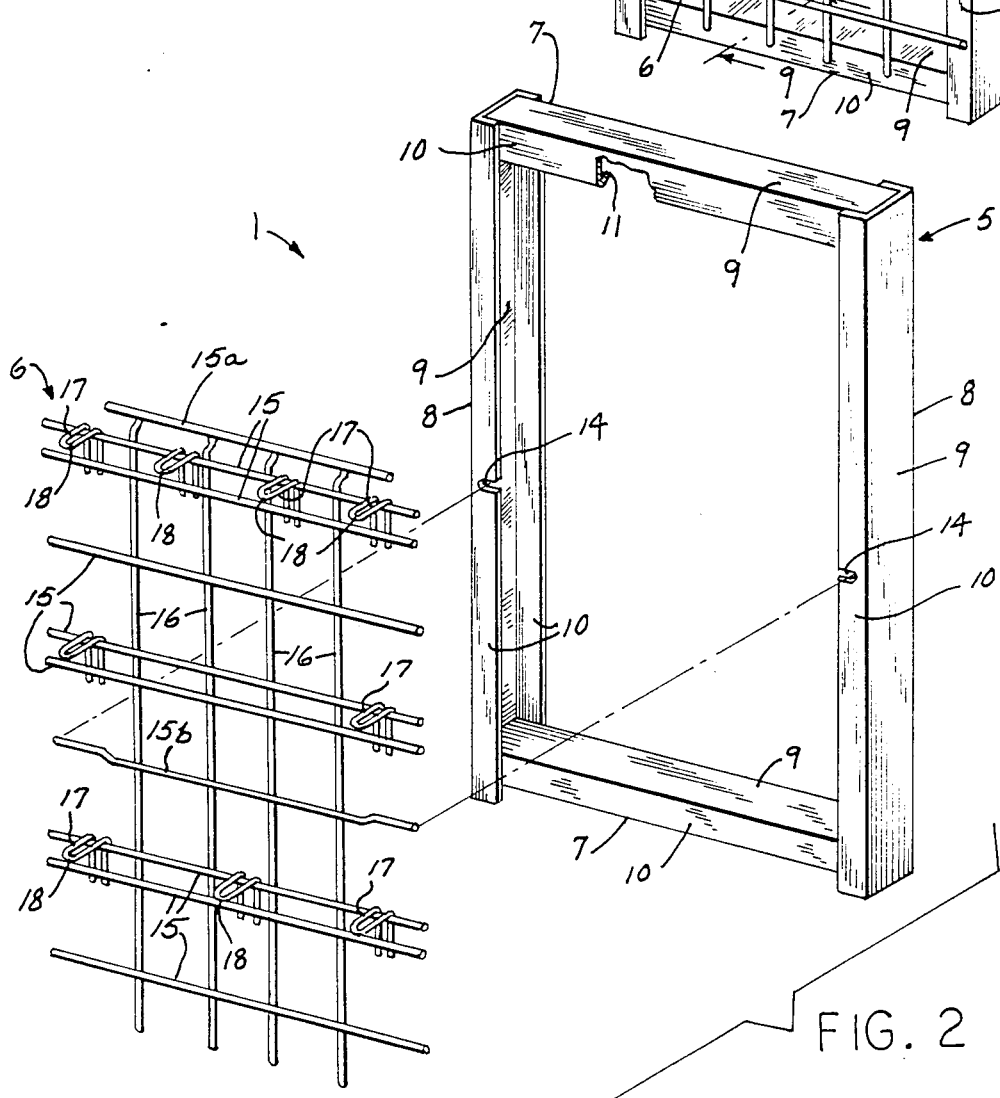

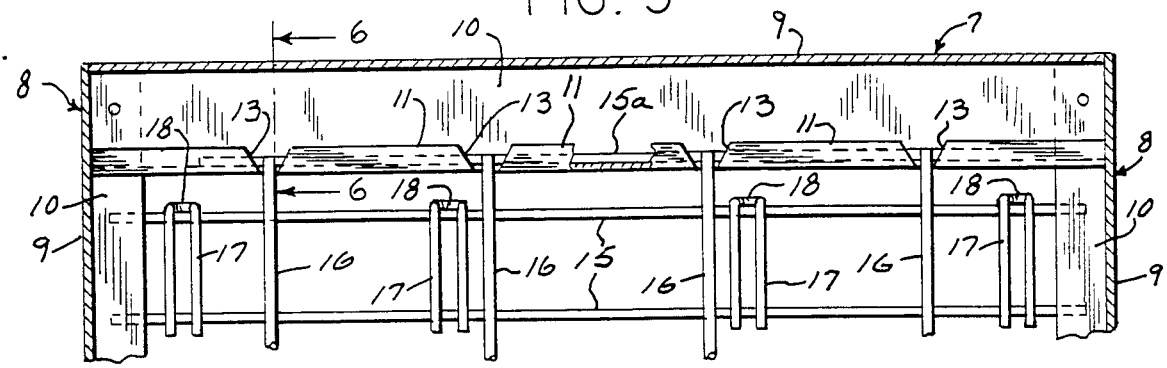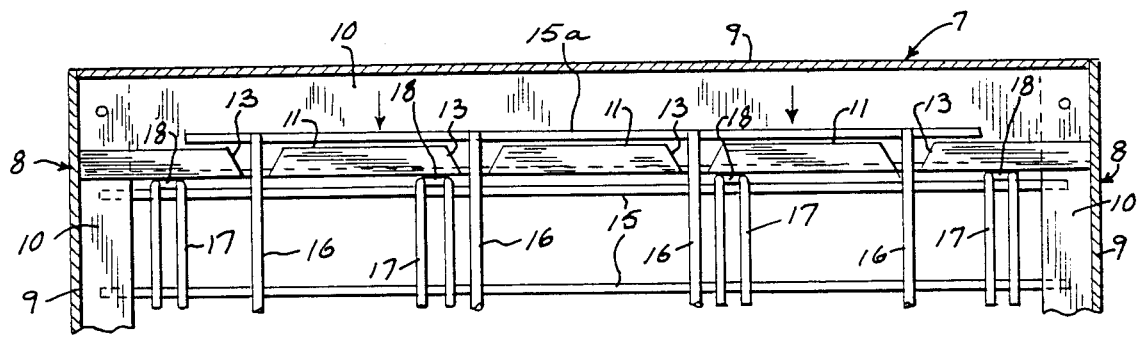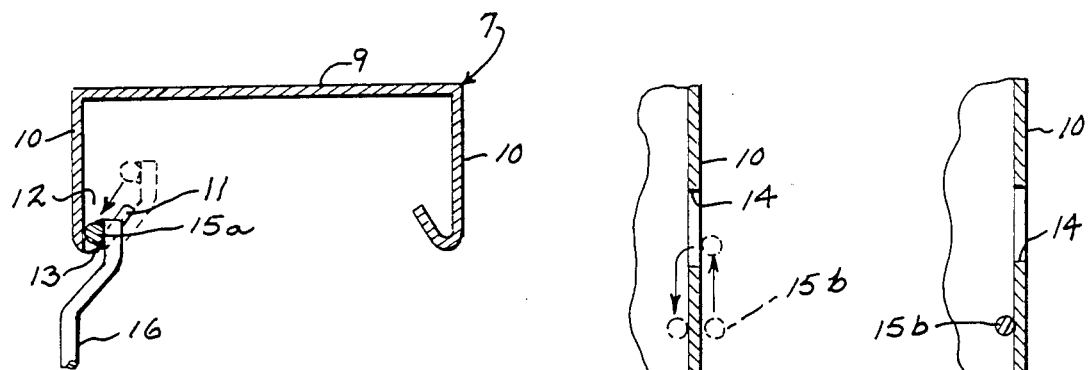

MEDIA SUPPORT MODULE FOR PAINT SPRAY BOOTHS AND THE LIKE

BACKGROUND AND SUMMARY OF THE INVENTION

This invention relates to a media support module for paint spray booths and the like, and more particularly to a module for use in multiples for forming the walls of various air treatment apparatus. The modules are adapted to removably mount large pads of layers of slit-and-expanded paper or other media which, for example, can catch paint overspray during a painting operation in a booth.

Generally, such media support modules have been previously used. The known modules have comprised a rectangular perimetrical frame of L-shaped section, with a plurality of adjacent frames being riveted together to form a booth wall. A wire grid has been provided for each module with spaced grid elements extending generally parallel to the frame side and end members. The grid elements were slightly longer than the distance between outer walls of opposed frame members and were provided with rubber tips. The grid could then be sprung into the frame from one side thereof and pushed up against one side of the "L", which acted as a stop. The dimensional relationships between the grid and frame, as mentioned above, together with the rubber tips, provided a tight friction fit on all four sides which was the sole means of holding the grid in the frame. A plurality of sharp nails or spikes were connected to the grid and extended transversely to the plane of the grid so that paint-catching pads or the like could be forced thereover to mount the pads within the confines of the frame.

The construction of the previously known modules has been subject to various disadvantages. For example, over a period of time, and as modules were used repetitively with fresh paint-catching pads being mounted thereon to replace filled pads, various exposed internal surfaces of the modules themselves tended to become coated with layers of paint which eventually became so thick that the layers had to be removed to make the modules usable. Cleaning of the module interior was often tedious, and the grid element end portions often had to be hand-scraped. Furthermore, operators applying a pad to a module sometimes hurt their hands, which could come into engagement with the pad-holding spikes.

In view of these problems, paint spray booth operators often preferred to use a different system for forming the booth walls. This system involved providing the media in rolled form and pulling the media downwardly over the booth walls, somewhat similar to a window shade or curtain. A plurality of such rolled and pulled-down media elements were positioned in side-by-side relationship, which could in some instances permit paint overspray to penetrate between adjacent media edges.

It is an object of the present invention to overcome the disadvantages of the prior modules when used in paint spray booths, so that they are constructed in a manner to essentially prevent the buildup of layers of overspray thereon, especially internally, and so that they may nevertheless be easily assembled and disassembled and also joined together in a bank of modules with a minimum of effort. The possibility of injury to an operator's hands has been virtually eliminated.

In accordance with the various aspects of the invention, a media support module for a paint spray booth or the like includes a rectangular frame which in the present embodiment is of generally channel section. The frame forms opposing spaced end members and connecting side members. One frame end is provided with an inwardly bent lip having spaced notches therein. The opposed frame side members are provided with slots. A generally rectangular grid is adapted to be removably mounted to the exterior of the frame. The grid includes spaced wire-like elements arrayed generally parallel to the frame end and side members. A plurality of wide prongs extend outwardly from the grid for impaling an air treatment pad thereon. At least several prongs are aligned in a vertical tier arrangement.

The grid is attached to the frame by placing the grid adjacent the front frame face and angularly lifting it up so the topmost grid element is within the frame and is aligned with the lip notches, the grid being centered by visually observing the position of the previously mentioned tiered prongs. The grid is then lowered to thus latch into the notches. The grid is also positioned so that a pair of ends of a horizontal grid element are disposed adjacent the frame side member slots and the element ends pushed therethrough. The grid is then slid downwardly into final position so that the pair of ends are trapped behind the frame front face.

Pads impaled on the prongs essentially cover the entire face of the module and protect it from such things as buildup of overspray.

BRIEF DESCRIPTION OF THE DRAWINGS

The accompanying drawings illustrate the best mode presently contemplated by the inventor for carrying out the invention.

In the drawings:

FIG. 1 is a perspective view of a portion of a paint spray booth with a plurality of media support modules of the present invention forming a booth wall;

FIG. 2 is an exploded front perspective view of a module;

FIG. 3 is a front perspective view of the assembled module,

FIG. 4 is a view similar to FIG. 5 and showing the initial placement of the top of the grid adjacent the lip notches;

FIG. 5 is a view taken on line 5—5 of FIG. 3 and showing the grid latched in the notches;

FIG. 6 is an enlarged vertical section taken on line 6—6 of FIG. 5 and showing the sequence of latching the grid into the notches;

FIG. 7 is a fragmentary sectional view and showing the sequence of locking the grid behind the frame side members;

FIG. 8 is a vertical section taken on line 8—8 of FIG. 3; and

FIG. 9 is a horizontal section taken on line 9—9 of FIG. 3.

DESCRIPTION OF THE PREFERRED EMBODIMENT

As best shown in FIG. 1 of the drawings, the concepts of the invention are directed to a module 1 usable in air treatment apparatus such as a spray booth, the frame of which is shown at 2, within which an object is to be sprayed with paint or the like. The booth is adapted to ultimately define an enclosure containing the object and spraying equipment (not shown), and air may be caused to flow therethrough and hence to a plenum 3 behind the booth. A plurality of modules 1 may be suitably connected to form the booth walls, and a plurality of pads 4, which may be of slit-and-expanded paper or other filtration construction are mounted to modules 1. In the present embodiment, the modules collect paint overspray and in such a manner that the overspray is essentially prevented from penetrating to the module elements by the pad media.

Referring especially to FIGS. 2 and 3, each module 1 comprises an assembly including a frame 5 and a grid 6.

Frame 5 is shown as being generally rectangular and is formed of opposing spaced top and bottom end members 7 connected by side members 8. In the present embodiment, each member 7 and 8 is contemplated as being elongated and of channel section including a base 9 which joins a pair of spaced unidirectionally inwardly extending flanges 10 disposed along one base edge. Adjacent channel members 7 and 8 are secured together at their corners by any suitable well-known means, not shown. The construction is such that top end member 7 and both side members 8 are positioned with their bases 9 facing outwardly. In the present embodiment, bottom end member 7 is reversed, with its base 9 facing inwardly. See FIG. 9. In some instances, bottom end member 7 need not be reversed.

As best shown in FIGS. 2, 4, 5 and 6, frame top end member 7 is provided with means for latchingly receiving grid 6. For this purpose, and in the present embodiment, the lower edge portion of forward frame flange 10 is bent inwardly and rearwardly as well as upwardly, thus forming a lip 11 disposed at an acute angle to the flange body, thus forming a trough 12 therewith. A plurality of downwardly extending spaced notches 13 are disposed along the edge of lip 11. In addition, and referring especially to FIGS. 2, 3, 7 and 8, forwardly facing flanges 10 on frame side members 8 are provided with means for trapping a portion of the grid and holding it to the frame. This means includes outwardly extending slots 14 in said last-named flanges. Slots 14 are disposed intermediate their respective flange ends and are aligned horizontally.

Likewise, grid 6 is shown as being generally planar and rectangular and is formed from a plurality of elongated interconnected wire-like elements or bars 15 and 16. Bars 15 are disposed parallel and generally horizontally, while bars 16 are disposed parallel and generally vertically, and are thus arrayed similarly and parallel to frame end and side members 7 and 8 respectively. Basically, grid bars 15 and 16 are straight, with most horizontal bars 15 being longer than the distance between the exposed edges of forward flanges 10 of frame side members 8, and vertical bars 16 being longer than the distance between the exposed edges of forward flanges 10 of frame end members 7.

The topmost grid bar 15a of grid 6 is shorter than the other bars 15 and its length is less than the distance between forward flanges 10 of frame side members 8, for purposes to be described. Grid bar 15a is also offset rearwardly from the plane of grid 6. In addition, a horizontal grid bar 15b is disposed intermediate top and bottom frame members 7 and 8, in this case centrally therebetween, and is offset forwardly from the plane of grid 6.

Furthermore, means for impaling a paint overspray pad 4 and holding it to the front face of module 1 are provided, and include a plurality of impalement members 17 secured to various horizontal grid bars 15 and extending forwardly from the plane of the grid. Members 17 are shown as being wire-like and having vertical portions secured to closely adjacent pairs of horizontal grid bars 15, these vertical portions making a right angle and thus forming forwardly extending horizontal wide prong portions terminating in a widely curved end 18, looking similar to the end of a paper clip. The wide construction of the prong terminal end portions serves to effectively hold a pad 4 thereto, while at the same time protecting an operator against injury.

Impalement members 17 may be distributed in any manner over the front face of grid 6. However, at least several members 17 serve to make the grid self-centering when it is assembled to the frame. For this purpose, and in the present embodiment, a plurality of members 17 are mounted in a generally vertical tier along the end portions of at least some of the horizontal bars 15. The members 17 are spaced horizontally apart on their respective bars a distance approximately equal to the distance between the edges of opposed flanges 10 of frame side members 8.

For purposes of assembling grid 6 to frame 5, and referring to FIGS. 2, 4 and 6, grid 6 is placed adjacent the front face of frame 5 adjacent the opening formed by members 7 and 8 so that the pairs of tiers of impalement members 17 are visually observable as being close to the flange edges of side members 7—thus the self-centering feature which tells the installer that the grid is generally centered relative to the frame. Grid 6 is then raised up at a slight angle so that short horizontal bar 15a enters within top end frame member 7 and is automatically positioned above lip 11 and trough 12 so that the suitably spaced vertical grid bars 16 depending from bar 15a are closely adjacent similarly spaced notches 13. See FIG. 4 and the dash line showing of FIG. 6. Grid 6 is then pivoted downwardly to a vertical position in general engagement with frame 5 and lowered downwardly until horizontal grid bar 15a seats in trough 12 so that grid 6 hangs from frame top end member 7. See FIG. 5 and the full line showing of FIG. 6. The upper end of grid 6 is now latched in place.

To lock the lower grid portion tightly against frame 5, and referring particularly to FIGS. 7 and 8, the latched grid 6 is initially positioned with grid bar 15b offset vertically downwardly from frame slots 14. Grid 6 is then lifted vertically along the frame until the end portions of bar 15b are aligned with slots 14, the grid is manually depressed inwardly along its vertical edges so that the end portions of bar 15b pass inwardly through slots 14 and into the frame interior. Grid 6 is then lowered to its final position so that bar 15b now is trapped behind the respective opposing vertical flanges 10, as in FIG. 8.

The final module assembly is shown in FIG. 3, with grid 6 latched and locked onto frame 5 with the ends of grid bars 15 and 16 overlapping the flanges 10 of the respective frame side and end members 8 and 7. As previously mentioned, the construction is such that when a pad 4 is applied, it is mounted to the exterior front face of module 1, rather than to an interior frame portion, as in the known prior construction. The result is to effectively reduce and substantially eliminate penetration of overspray onto module 1, and the undesirable buildup of layers of paint or the like on the module elements.

Multiple modules 1 are secured together in any desirable way to form a bank of modules forming the spray booth walls.

When it is desired to disassemble one or more modules, such as for gaining access to plenum 3, any pads 4 remaining on the modules are pulled off impalement members 17 and each grid 6 is removed in a sequence generally the reverse of that described above.

The terms front, rear, top, bottom, end, side, horizontal and vertical are being used herein relative to certain elements and operations, for purposes of language convenience only. The terms could be varied or alternated, depending upon the orientation and exact construction of module 1, without departing from the spirit of the invention.

Various modes of carrying out the invention are contemplated as being within the scope of the following claims particularly pointing out and distinctly claiming the subject matter which is regarded as to the invention.

I claim:

1. A support module (1) for use in forming the walls of a paint spray booth or the like and for holding air treatment media (4) thereto, comprising, in combination:
   (a) a generally rectangular frame (5) having front and rear portions and spaced top and bottom end members (7) connected by side members (8), and with said end and side members (7, 8) having inwardly extending flanges (10) disposed at the front of the frame,
   (b) a generally rectangular grid (6) having spaced horizontal and vertical bars (15, 16), and with said grid being removably mountable to said frame,
   (c) first cooperative means (11-13, 15a) for removably latching one portion of said grid to said frame top end member (7),
   (d) second cooperative means (10, 14, 15b) for removably locking another portion of said grid to said frame side members (8),
   (e) and a plurality of impalement members (17) mounted to said grid and extending outwardly from said front of said frame for receipt of a said media thereon.

2. The support module of claim 1 in which said first cooperative means comprises:
   (a) a lip (11) extending upwardly and rearwardly from the flange (10) of said frame top end member (7) and forming a trough (12) therewith,
   (b) a plurality of notches (13) disposed in said lip and with said notches being spaced generally equally to the spacing of at least some of said vertical grid bars (16),
   (c) and an upper horizontal grid bar (15a) connected to said vertical bars (16) and with said upper bar being insertable into said trough (12) with said vertical bars received within said notches (13).

3. The support module of claim 2 in which said upper horizontal grid bar (15a) is shorter than the distance between opposed flanges (10) of said frame side members (8) to permit access of said last-named bar (15a) to said trough (12).

4. The support module of claim 2 in which said impalement members (17) are arranged on said grid (6) in a manner to provide visual self-centering of said grid relative to said frame (5) at the time of insertion of said upper grid bar (15a) into said trough (12).

5. The support module of claim 1 or 2:
   (a) in which at least some of said horizontal grid bars (15) are longer than the distance between opposed flanges (10) of said frame side members (8),
   (b) and said second cooperative means comprises:
      (1) horizontal slots (14) disposed in opposed flanges (10) of said frame side members (8) intermediate the ends of the latter,
      (2) one of said grid bars (15b) being disposed with at least one of its end portions adjacent a said slot (14) and initially outwardly of a said opposed flange (10),
      (3) the construction being such that, upon lifting said grid (6) along said frame (5), said bar end portion is depressable through the said adjacent slot (14), and upon lowering of said grid said bar end portion is trapped behind said last-named opposed flange (10).

6. The support module of claim 5 wherein: when said grid (6) is latched and locked to said frame (5), the end portions of said grid bars (15, 16) overlap said flanges (10) of said end and side frame members (7, 8).

7. The support module of claim 1 or 2 in which said impalement members (17) have wide terminal end portions (18).

8. The support module of claim 7 in which said terminal end portions (18) of said impalement members (17) are widely curved and paper-clip-like.

9. The support module of claim 5 in which said impalement members (17) have wide terminal end portions (18).

10. A support module (1) for use in forming the walls of a paint spray booth or the like and for holding air treatment media (4) thereto, comprising, in combination:
    (a) a generally rectangular frame (5) having front and rear portions and spaced top and bottom end members (7) connected by side members (8), and with said end and side members (7, 8) having inwardly extending flanges (10) disposed at the front of the frame,
    (b) a generally rectangular grid (6) having spaced horizontal and vertical bars (15, 16), and with said grid being removably mountable to said frame,
    (c) cooperative means (10-14, 15a, 15b) for removably attaching said grid to said frame,
    (d) and a plurality of impalement members (17) mounted to said grid and extending outwardly from said front of said frame for receipt of a said media thereon,
    (e) said impalement members (17) having wide terminal end portions (18).

11. The support module of claim 10 in which said impalement members (17) are arranged on said grid (6) in a manner to provide visual self-centering of said grid relative to said frame (5) at the time of attachment of said grid to said frame.

* * * * *